US012112416B2

(12) United States Patent
Seo et al.

(10) Patent No.: US 12,112,416 B2
(45) Date of Patent: Oct. 8, 2024

(54) FULL-BODY INTEGRATED MOTION CAPTURE METHOD

(71) Applicant: 5MOTION INC., Seoul (KR)

(72) Inventors: Young Ho Seo, Seoul (KR); Moon Seok Oh, Goyang-si (KR)

(73) Assignee: 5MOTION INC., Seoul (KR)

( * ) Notice: Subject to any disclaimer, the term of this patent is extended or adjusted under 35 U.S.C. 154(b) by 204 days.

(21) Appl. No.: 17/847,316

(22) Filed: Jun. 23, 2022

(65) Prior Publication Data

US 2023/0401774 A1 Dec. 14, 2023

(30) Foreign Application Priority Data

Jun. 9, 2022 (KR) .................. 10-2022-0070309

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/248* (2017.01); *G06T 7/251* (2017.01); *G06T 7/292* (2017.01);
(Continued)

(58) Field of Classification Search
None
See application file for complete search history.

(56) References Cited

U.S. PATENT DOCUMENTS

| 9,141,852 B1* | 9/2015 | Cosgun | .................. G06V 40/10 |
| 2019/0139297 A1* | 5/2019 | Chen | ....................... G06T 19/20 |

(Continued)

FOREIGN PATENT DOCUMENTS

| KR | 10-1849373 B1 | 4/2018 |
| KR | 10-2097016 B1 | 4/2020 |

(Continued)

OTHER PUBLICATIONS

Joo et al., "Total capture: A 3d deformation model for tracking faces, hands, and bodies," Proceedings of the IEEE conference on computer vision and pattern recognition (Year: 2018).*

(Continued)

*Primary Examiner* — Anh-Tuan V Nguyen
(74) *Attorney, Agent, or Firm* — NKL LAW; Jae Youn Kim

(57) ABSTRACT

Proposed is a full-body integrated motion capture method capable of integrally detecting joints for full-body motion capture by extracting body joints of a body from a low-resolution multiview video, detecting face and hand regions through the body joints, and precisely extracting detailed joints for a face and a hand from a high-resolution video of the face and hand regions. The full-body integrated motion capture method includes: (a) receiving a multiview color-depth video and a high-resolution video; (b) extracting a body skeleton from the low-resolution video; (c) detecting face and hand regions by using joints of a neck and a wrist of the body skeleton; (d) extracting a detailed joint from a region of the high-resolution video corresponding to the face and hand regions; and (e) generating motion data by integrating a body joint and the detailed joint.

10 Claims, 14 Drawing Sheets

(51) Int. Cl.
  *G06T 7/292*   (2017.01)
  *G06T 13/80*   (2011.01)
  *G06V 10/50*   (2022.01)
  *G06V 10/77*   (2022.01)

(52) U.S. Cl.
  CPC .............. *G06T 13/80* (2013.01); *G06V 10/50* (2022.01); *G06V 10/7715* (2022.01); *G06T 2207/10028* (2013.01); *G06T 2207/20016* (2013.01); *G06T 2207/20084* (2013.01)

(56) References Cited

U.S. PATENT DOCUMENTS

| | | | | |
|---|---|---|---|---|
| 2019/0188533 | A1* | 6/2019 | Katabi | G06V 10/82 |
| 2019/0251341 | A1* | 8/2019 | Nie | G06V 20/46 |
| 2022/0070391 | A1* | 3/2022 | Duenyas | H04N 25/42 |
| 2022/0114786 | A1* | 4/2022 | Zhang | G06T 17/00 |

FOREIGN PATENT DOCUMENTS

| | | |
|---|---|---|
| KR | 10-2020-0056764 A | 5/2020 |
| KR | 10-2020-0073031 A | 6/2020 |
| KR | 10-2228639 B1 | 3/2021 |

OTHER PUBLICATIONS

Face Mesh, "MediaPipe Face Mesh", https://google.github.io/mediapipe/solutions/face_mesh, [copyrighted 2020].

Zhe Cao et al., "OpenPose: Realtime Multi-Person 2D Pose Estimation using Part Affinity Fields", IEEE Transactions on Pattern Analysis and Machine Intelligence, arXiv preprint arXiv:1812.08008 (2018).

Yaobin He et al., "MR-DBSCAN: An Efficient Parallel Density-based Clustering Algorithm using MapReduce", 2011 IEEE 17th International Conference on Parallel and Distributed Systems, pp. 473-480, 2011.

* cited by examiner

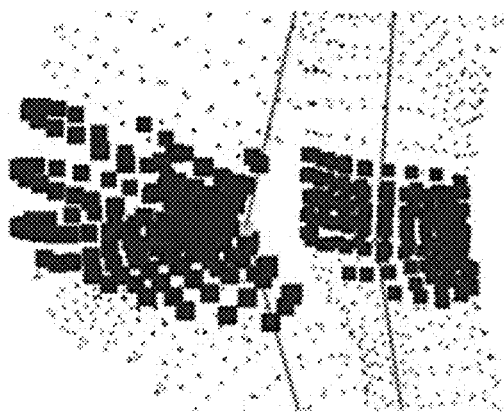
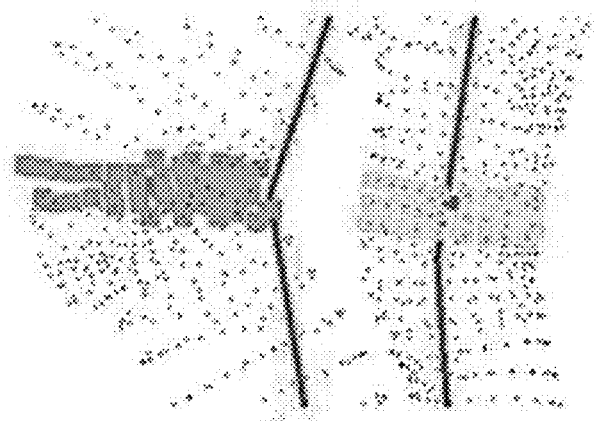
FIG. 12A FIG. 12B
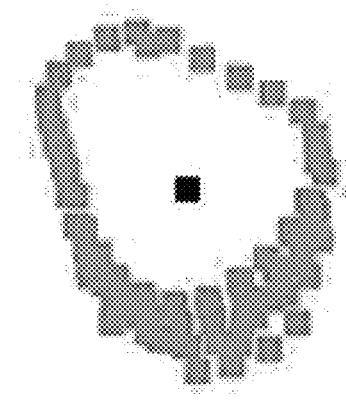
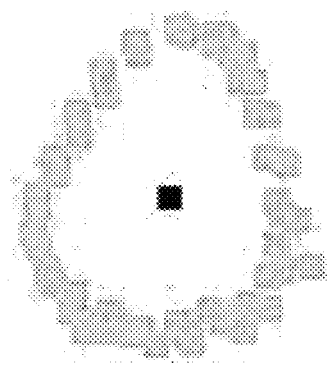
FIG. 13

FULL-BODY INTEGRATED MOTION CAPTURE METHOD

BACKGROUND OF THE INVENTION

1. Field of the Invention

The present invention relates to a full-body integrated motion capture method capable of integrally detecting joints for full-body motion capture by extracting body joints of a body from a low-resolution multiview video, detecting face and hand regions through the body joints, and precisely extracting detailed joints for a face and a hand from a high-resolution video of the face and hand regions.

2. Description of the Related Art

Recently, in the field of animations, games, or visual effects (VFX), virtual characters have been expressed more precisely and realistically by using a three-dimensional image technology.

The virtual characters may perform a predefined animation according to a scenario. In particular, the virtual characters may move based on reality, and one character may include innumerable animations.

Such characters are produced as three-dimensional (3D) characters in order to express realistic vitality, and animations are also produced in three dimensions. In particular, in order to acquire a precise and realistic motion of the character, a method using a special marker has been widely used. In other words, after a special marker is attached to a joint of a person, position and rotation data of each joint may be recognized by a special device in real time to acquire motion data, and the acquired motion data may be saved as an animation file. While the above method has an advantage that natural and accurate data may be obtained, the method has a disadvantage that a motion has to be properly implemented by a skilled person, and great expense may be required due to use of expensive equipment.

In addition, in order to solve the above problems, a technology for estimating a skeleton structure of a human body by using a multiview video has been proposed [Patent Document 1]. However, according to the related art, it is difficult to detect a detailed movement of a face, a hand, or the like.

Therefore, a main movement of a body and a detailed movement of a face, a hand, or the like of a character have to be captured in mutually different schemes or with mutually different types of equipment. In addition, results thereof may be combined into one piece. In other words, such a method requires double work processes, so that a cost may be increased, and work efficiency may be decreased.

In other words, a conventional sensor-based motion capture method may not enable integrated motion capture. A current technology is configured to separately capture the face, the body, and the hand by separate equipment, and integrate results thereof in post-production. Therefore, a work process may be repeatedly performed, which requires much manpower and work time, and capture data of the face, the body, and the hand have to be subject to mutually different correction works so as to be integrated into one piece. In a case of an image-based motion capture, integrated capture is limitedly possible, whereas a degree of precision may be low.

Conventional optical motion capture has a limitation in object (animal) capture. According to a basic scheme of a previous technology, an object (animal) may be separately captured and synthesized, and there may be many difficulties caused by a limitation of motion equipment in a case of the animal, so that additional costs and manpower may be involved. In addition, expensive motion capture cameras and capture suits are essentially required, and the motion capture is possible only in a dedicated studio having an environment in which lighting and backgrounds are controlled.

Therefore, an image-based integrated full-body motion capture technology is required to compensate for the above disadvantages.

DOCUMENTS OF RELATED ART

Patent Documents (Patent Document 1) Korean Patent Registration No. 10-1849373 (published on Apr. 17, 2018)
(Patent Document 2) Korean Patent Registration No. 10-2097016 (published on Apr. 6, 2020)
(Patent Document 3) Korean Unexamined Patent Publication No. 10-2020-0056764 (published on May 25, 2020)
(Patent Document 4) Korean Unexamined Patent Publication No. 10-2020-0073031 (published on Jun. 23, 2020)
(Patent Document 5) Korean Patent Registration No. 10-2228639 (published on Mar. 16, 2021)

Non-Patent Documents (Non-patent Document 1) https://google.github.io/mediapipe/solutions/face_mesh
(Non-patent Document 2) Cao, Zhe, et al. "OpenPose: realtime multi-person 2D pose estimation using Part Affinity Fields." arXiv preprint arXiv:1812.08008 (2018).
(Non-patent Document 3) He, Yaobin, et al. "Mr-dbscan: an efficient parallel density-based clustering algorithm using mapreduce." 2011 IEEE 17th International Conference on Parallel and Distributed Systems. IEEE, 2011.

SUMMARY OF THE INVENTION

To solve the problems described above, an object of the present invention is to provide a full-body integrated motion capture method capable of integrally detecting joints for full-body motion capture by extracting body joints of a body from a low-resolution multiview video, detecting face and hand regions through the body joints, and precisely extracting detailed joints for a face and a hand from a high-resolution video of the face and hand regions.

To achieve the objects, according to the present invention, there is provided a full-body integrated motion capture method including: (a) receiving a multiview color-depth video and a high-resolution video; (b) extracting a body skeleton from the low-resolution video; (c) detecting face and hand regions by using joints of a neck and a wrist of the body skeleton; (d) extracting a detailed joint from a region of the high-resolution video corresponding to the face and hand regions; and (e) generating motion data by integrating a body joint and the detailed joint.

In addition, the present invention provides the full-body integrated motion capture method, wherein the step (b) may include: (b1) generating a point cloud of a three-dimensional object; (b2) acquiring a projection image obtained by projecting the point cloud of the three-dimensional object onto at least three projection planes that are different from each other; (b3) acquiring a two-dimensional skeleton image in each direction for each of at least three projection images by using a neural network, in which a two-dimensional joint and a bone configured to connect joints to each other are displayed in the skeleton image; (b4) restoring the two-dimensional skeleton image in each direction, and detecting a three-dimensional internal joint by using a restored three-dimensional surface joint in each direction; and (b5) generating a three-dimensional body skeleton including the detected three-dimensional internal joint.

In addition, the present invention provides the full-body integrated motion capture method, wherein, in the step (b2), the projection image in each direction may be acquired by setting the projection plane such that directions of normal vectors of N projection planes divide 360 degrees into N equal parts about a vertical axis, and projecting the point cloud of the three-dimensional object onto the projection plane in each direction.

In addition, the present invention provides the full-body integrated motion capture method, wherein, in the step (b2), the projection image may be acquired by obtaining an axis-aligned bounding box (AABB) for the three-dimensional object, and performing the projection onto four surfaces of the AABB, which are left, right, front, and rear surfaces of the AABB.

In addition, the present invention provides the full-body integrated motion capture method, wherein, in the step (b2), the projection image for the three-dimensional object may be acquired by projecting the point cloud of the three-dimensional object onto a horizontal plane, obtaining a front direction vector on a two-dimensional plane onto which the point cloud is projected, and rotating the three-dimensional object such that a front surface of the three-dimensional object is arranged on a vertical axis by using the front direction vector.

In addition, the present invention provides the full-body integrated motion capture method, wherein, in the step (b2), the front direction vector may be obtained through principal component analysis, in which a covariance matrix may be obtained for the two-dimensional plane onto which the point cloud is projected, an eigenvector for the obtained matrix may be obtained, and a vector having a smallest eigenvalue may be set as the front direction vector.

In addition, the present invention provides the full-body integrated motion capture method, wherein the neural network may include an OpenPose network.

In addition, the present invention provides the full-body integrated motion capture method, wherein, in the step (b4), the two-dimensional skeleton image in each direction may be restored into three-dimensional coordinates, and an intersection region of a straight line that is perpendicular to the projection plane in the restored surface joint of the three-dimensional coordinates in each direction may be determined as the three-dimensional internal joint.

In addition, the present invention provides the full-body integrated motion capture method, wherein, in the step (b5), for each internal joint of the generated three-dimensional skeleton, a plane that bisects an angle formed by at least two bones connected to the internal joint (hereafter referred to as "division plane") may be obtained, points within a predetermined reference value range in the division plane may be clustered, a center of a cluster obtained through the clustering may be detected, and coordinates of the internal joint may be corrected by using a center point.

In addition, the present invention provides the full-body integrated motion capture method, wherein, in the step (b5), the clustering may be performed by using a density-based spatial clustering of applications with noise (DBSCAN) algorithm, and the center point may be detected by performing circle fitting.

In addition, according to the present invention, there is provided a computer-readable recording medium recorded with a program for performing a full-body integrated motion capture method.

As described above, according to the full-body integrated motion capture method of the present invention, the body joints may be extracted from the low-resolution multiview video, and the detailed joints may be extracted from the high-resolution video of the face and hand regions, so that detailed movements of the face and hand regions can be extracted more precisely while reducing an amount of calculations for processing the multiview video, and thus movements can be precisely extracted at a high speed.

BRIEF DESCRIPTION OF THE DRAWINGS

FIGS. 3A-3B are views illustrating a configuration of a camera system used in the present invention, wherein FIG. 3A shows a configuration viewed from a front side, and FIG. 3B shows a configuration viewed from a top.

FIGS. 5A-5B are views illustrating a projection image rotated such that a front direction of an object is arranged on a z-axis according to one embodiment of the present invention, wherein FIG. 5A shows a projection image before the rotation, and FIG. 5B shows a projection image after the rotation.

FIGS. 9A-9D are views illustrating an extracted joint according to one embodiment of the present invention, wherein FIG. 9A shows a two-dimensional skeleton, FIG. 9B shows a joint intersection point, FIG. 9C shows a joint error, and FIG. 9D shows a target joint and a neighborhood point cloud thereof.

FIGS. 12A-12B are views illustrating a point cloud for an object, 12A a point set before clustering, and 12B a point set after the clustering according to one embodiment of the present invention.

FIG. 13 is a view illustrating a center of a cluster obtained by using circle fitting according to one embodiment of the present invention.

FIGS. 16A-16B are views illustrating a detailed joint or a detailed skeleton according to one embodiment of the present invention, in which FIG. 16A shows a detailed joint of a face, and FIG. 16B shows a detailed joint of a hand.

DETAILED DESCRIPTION OF THE INVENTION

Figure 1:
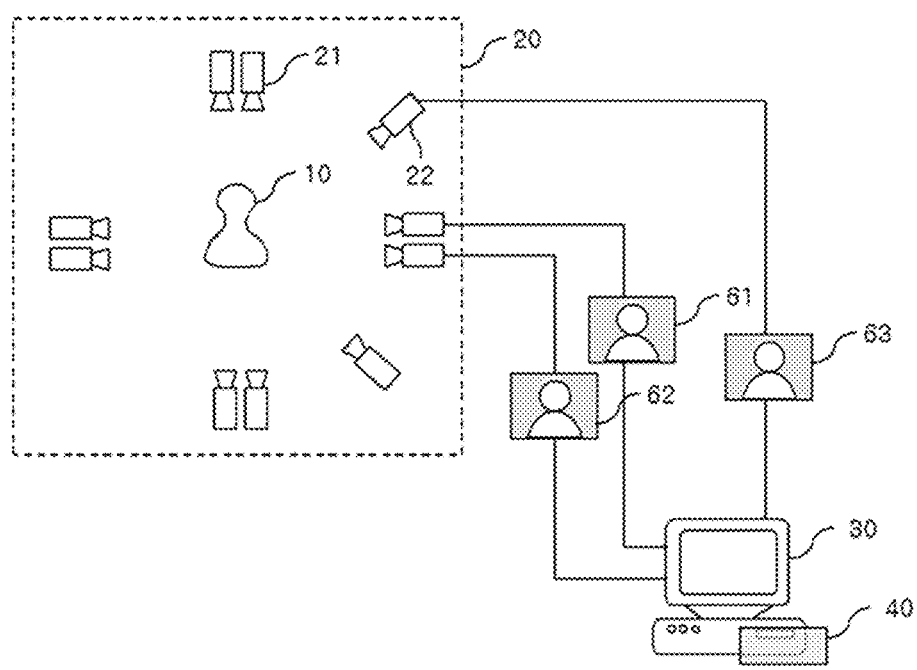
FIG. 1 is a view showing a configuration of an entire system for implementing the present invention.

Hereinafter, specific details for implementing the present invention will be described with reference to the drawings.

In addition, in describing the present invention, the same parts will be denoted by the same reference numerals, and redundant descriptions thereof will be omitted.

First, examples of a configuration of an entire system for implementing the present invention will be described with reference to FIG. 1.

As shown in FIG. 1, a full-body integrated motion capture method according to the present invention may be implemented as a program system on a computer terminal 30, which is configured to receive multiview depth and color (RGB, etc.) and high-resolution videos 60 captured by a camera system to capture a motion. In other words, the motion capture method may be configured as a program so as to be installed and executed in the computer terminal 30. The program installed in the computer terminal 30 may operate as one program system 40.

Meanwhile, as another embodiment, the motion capture method may be configured and implemented as one electronic circuit such as an application-specific integrated circuit (ASIC) in addition to being configured as a program to operate on a general-purpose computer. Alternatively, the motion capture method may be developed as a dedicated computer terminal 30 for exclusively processing only an operation of capturing a motion from multiview depth and color videos. This will be referred to as a motion capture system 40. Other possible embodiments may also be implemented.

Meanwhile, the camera system 20 may include a plurality of color-depth (RGB-D) cameras 21 for capturing an object 10 such as a body at different viewpoints, and a high-resolution camera 22.

In addition, each of the RGB-D cameras 21 may include a depth camera and a color camera (or an RGB camera). The depth camera may be a camera for measuring a depth of the object 10, and may measure depth information to output a depth video or image 61. The color camera may be a general RGB camera, and may acquire a color video or image 62 of the object 10.

Further, the high-resolution camera 22 may be a high-resolution RGB camera.

A multiview depth video 61 and a multiview color video 62 captured by a multiview RGB-D camera 21 and a high-resolution video 63 captured by the high-resolution camera 22 may be directly input to and stored in the computer terminal 30, and may be processed by the motion capture system 40. Alternatively, the multiview depth video 61, the multiview color video 62, and the high-resolution video 63 may be stored in a storage medium of the computer terminal 30 in advance, and the stored depth video 60 may be read and input by the motion capture system 40.

A video may include temporally consecutive frames. For example, when a frame at a current time t is referred to as a current frame, a frame at an immediately preceding time t−1 will be referred to as a previous frame, and a frame at t+1 will be referred to as a next frame. Meanwhile, each of the frames may have a color video (or a color image) and a depth video (or depth information).

In particular, the object 10 may be captured at different viewpoints corresponding to a number of multiview RGB-D cameras 21, and the multiview depth and color videos 61 and 62 corresponding to the number of the cameras may be acquired at a specific time t.

Meanwhile, the depth video 61, the color video 62, and the high-resolution video 63 may include temporally consecutive frames. One frame may include one image. In addition, each of the videos 61, 62, and 63 may have one frame (or image). In other words, each of the videos 61, 62, and 63 may be one image.

Although capturing of a motion in the multiview depth video, the multiview color video, and the high-resolution video means detection from each of the depth/color/high-resolution frames (or images), the terms 'video' and 'image' will be interchangeably used unless it is necessary to particularly distinguish the terms from each other in the following description.

Next, the full-body integrated motion capture method according to one embodiment of the present invention will be described with reference to FIG. 2.

Figure 2:
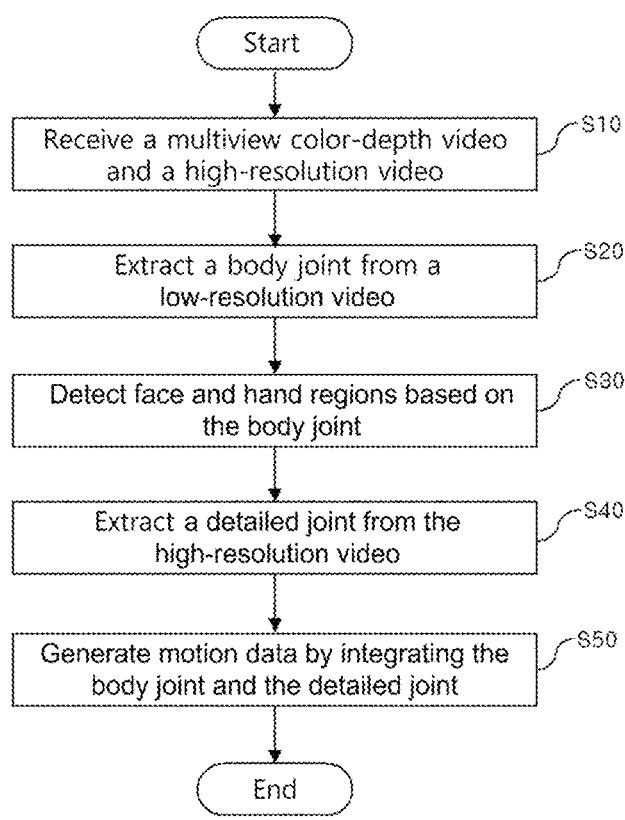
FIG. 2 is a flowchart for describing a full-body integrated motion capture method according to one embodiment of the present invention.

As shown in FIG. 2, the full-body integrated motion capture method according to the present invention may include: receiving a multiview color-depth video and a high-resolution video (S10); extracting a body joint (S20); detecting face and hand regions (S30); extracting a detailed joint (S40); and generating integrated motion data (S50).

First, the multiview color-depth video and the high-resolution video may be received (S10).

In other words, the multiview color-depth video and the high-resolution video, which are obtained by capturing a three-dimensional object (or body), may be received. The multiview color-depth video may be a video of an entire body, and the high-resolution video may be a video of a detailed body component such as a face or a hand.

The multiview color-depth video may be a video (or an image) acquired from a plurality of color-depth (RGB-D) cameras. In other words, multiview color-depth videos in which a number of the multiview color-depth videos corresponds to a number of the cameras may be received.

In addition, the high-resolution video (or a high-resolution color video) may be a video captured by a high-resolution RGB camera. Preferably, at least two high-resolution RGB cameras may be provided. Further, a number of the high-resolution RGB cameras may be less than or equal to the number of the multiview color-depth cameras. In other words, since the high-resolution camera may capture only the face and hand regions, the number of the high-resolution cameras may be less than the number of the multiview color-depth cameras configured to capture the entire body.

Further, the high-resolution video may have a resolution that is higher than a resolution of the multiview color-depth video. Preferably, the high-resolution video may have a resolution that is at least twice the resolution of the multiview color-depth video.

Figure 3A:
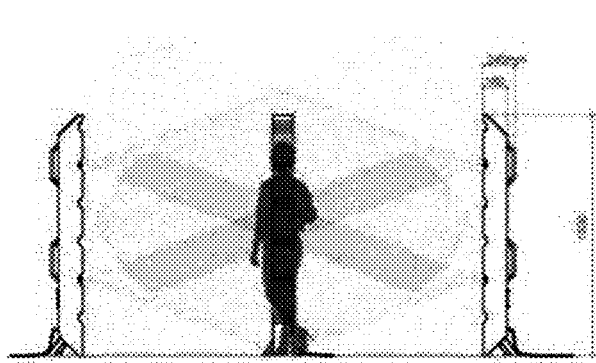
Figure 3B:
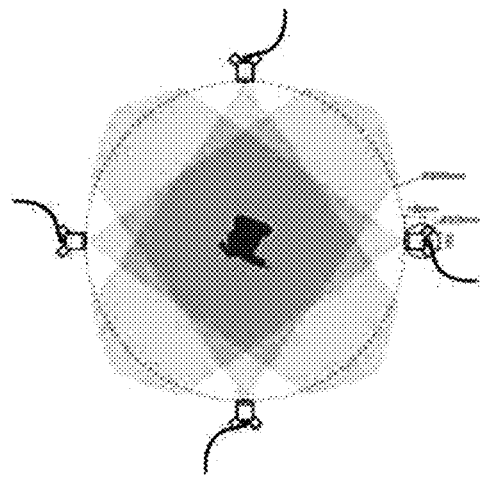

As shown in FIG. 3, as one example, the camera system for the multiview color-depth video may be implemented as a system for acquiring a 3D volumetric point cloud by using eight RGB-D cameras. Eight sets of color (RGB, etc.) videos and depth videos acquired by using the system of FIG. 3 may be converted into point clouds through a pre-processing process. As a result, eight sets of point clouds may be generated.

In addition, the multiview cameras and the high-resolution camera may be calibrated in advance, and a parameter of each of the cameras may be obtained in advance. Therefore, all the videos of the multiview cameras and the high-resolution video may be converted into a world coordinate system (or a reference coordinate system). All the cameras used for motion capture may be aligned based on the world coordinate system through an initial external calibration process, and three-dimensional position information of an object in a video received from all the cameras may be known.

In detail, calibration may be performed on the multiview camera and the high-resolution camera by using a ChArUco board or the like, and extrinsic parameters of each of the cameras may be obtained by using coordinates matched by the calibration. The parameters may be calculated by using an optimization algorithm so that a Euclidean square distance of coordinates matched to the parameters may be minimized. A transformation matrix of a coordinate system may include parameters for rotation angles and translation values of each of x, y, and z-axes.

After one camera is set as a reference coordinate system, parameters for transforming coordinate systems of other cameras with the reference coordinate system may be obtained. $X_{ref}$ may represent coordinates of a reference camera, and X, may represent coordinates of remaining cameras. $R_{i \rightarrow ref}$ and $t_{i \rightarrow ref}$ may represent rotation and translation matrices from each of the cameras to the reference camera, respectively. Initially, R may be a unit matrix, and $t_{i \rightarrow ref}$ may be configured such that all entries are zeros.

In Mathematical Formula 1 below, when an initial parameter is applied, a result may be $X_i$, which may converge to $X_{ref}$ as the optimization is performed.

$$X'_i = R_{i \rightarrow ref} X_i + t_{i \rightarrow ref} \qquad (1)$$

A loss function to which the optimization is to be performed may be an average value of a squared Euclidean distance (SED) of $X_{ref}$ and $X_i'$. Mathematical Formula 2 may represent an error function (or a loss function).

$$f_{Error} = \frac{1}{N} \sum_{j=0}^{N} \| X_{ref}(j) - X'_i(j) \|_2^2 \qquad \text{[Mathematical Formula 2]}$$

A process of differentiating the loss function with respect to transformation parameters of the coordinate system and updating the parameters so that the function may be minimized may be expressed by in Mathematical Formula 3 below. α may be a learning rate that is a constant, and a value of 0.01 may be used as α. $P_{n+1}$ and $P_n$ may be parameters in $(n+1)^{th}$ and $n^{th}$ repetitive calculations, respectively.

$$P_{n+1} = P_n - \alpha \frac{\partial f_{Error}}{\partial P_n} \qquad \text{[Mathematical Formula 3]}$$

When the parameters of each of the cameras are obtained by Mathematical Formula 3, transformation from a camera coordinate system to the world coordinate system may be performed by using Mathematical Formula 4, and the point cloud may be aligned based on a unified coordinate system.

$$P_C = R \times P_W + t \qquad (4)$$

In this case, Pw may represent world coordinates (reference camera coordinates), and Pc may represent camera coordinates.

Next, the body joint and a body skeleton may be extracted from the multiview color-depth video (or a low-resolution video) (S20).

In other words, a point cloud of a three-dimensional object may be generated from the multiview color-depth low-resolution video, a projection image may be acquired by projecting the point cloud in a plurality of directions, a two-dimensional joint or skeleton image may be acquired by inputting the projection image to a neural network, and the two-dimensional joint or skeleton image may be restored to extract a three-dimensional joint or skeleton (or body joint/skeleton).

In this case, the multiview low-resolution video may be a video of the entire body.

In addition, the body joint/skeleton may be a joint in the entire body, and refers to joints of a neck, a wrist, a knee, a waist, and the like, and a skeleton including the joints. Preferably, a configuration of the body joint or the body skeleton may be set in advance. A skeleton may include a joint and a bone for connecting joints to each other.

Figure 4:
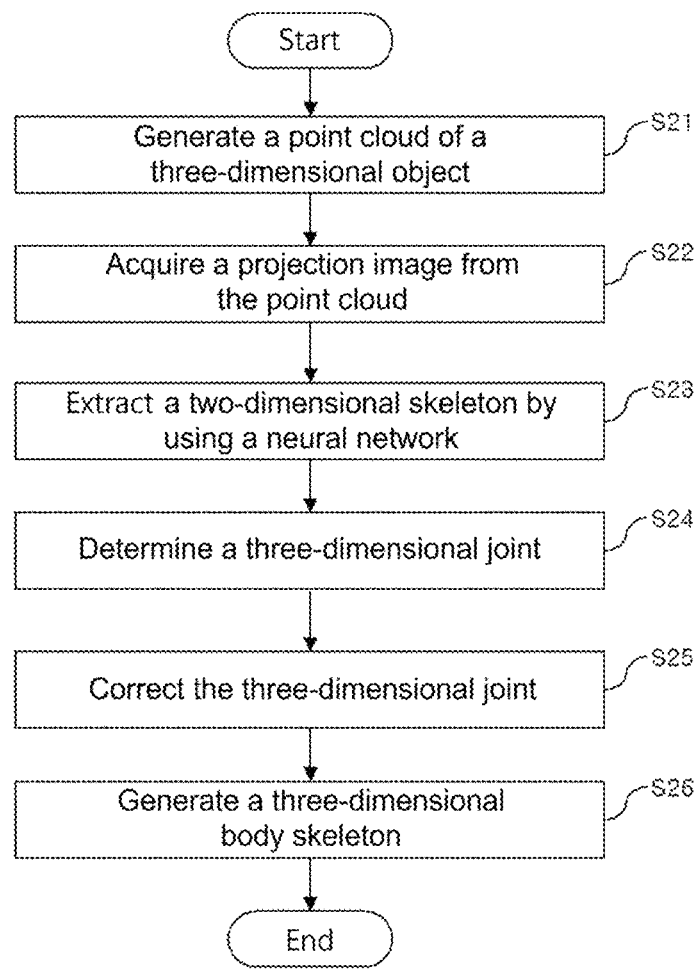
FIG. 4 is a flowchart for describing a detailed method of extracting a body joint according to one embodiment of the present invention.

In detail, as shown in FIG. 4, the extracting of the body skeleton (S20) may include: generating a point cloud (S21); acquiring a projection image (S22); extracting a two-dimensional skeleton (S23); determining a three-dimensional body joint (S24); and correcting the body joint (S25).

In other words, when a low-resolution point cloud is captured (or acquired) (S21), projection images for four surfaces may be generated to extract a 3D skeleton (S22). Next, a 2D body skeleton of the projection image may be extracted by using an OpenPose library (S23), and an intersection point for joints in a space to calculate the 3D skeleton may be calculated (S24). Thereafter, a post-processing process for extracting a high-precision 3D skeleton may be performed (S25). Finally, a three-dimensional body skeleton may be extracted (S26).

First, an integrated point cloud in the unified coordinate system may be generated (S21).

In other words, point clouds of the three-dimensional object according to different viewpoints (or different coordinate systems) may be extracted from each of the low-resolution color-depth videos. In addition, matching of the point clouds of each viewpoint may be performed to generate an entire point cloud in the integrated coordinate system (or the world coordinate system).

The point cloud of the three-dimensional object may be data for expressing a three-dimensional image, and may include three-dimensional coordinates, color information, normal vector information, and the like. Meanwhile, the color information may be acquired from the color video.

Next, the projection image of the three-dimensional object may be acquired by projecting the point cloud (S22).

When the 2D skeleton is extracted by inputting the projection image of the point cloud (or the three-dimensional object) to an OpenPose network, a skeleton extracted from an image obtained by performing the projection in a front direction may have high accuracy. Therefore, spatial distribution of three-dimensional coordinates of the point cloud may be analyzed to detect a front surface of the object, and the object may be rotated such that a front direction of the point cloud is parallel to a Z-axis direction.

Principal component analysis (PCA) may be used to detect the front direction. The principal component analysis may be used to detect principal components of distributed data. When the principal component analysis is performed on the three-dimensional coordinates of the point cloud, a vector that may represent distribution of the point cloud with respect to the x, y, and z-axes in a simplest way may be obtained.

In general, an object such as a person may be located on a ground surface. Therefore, each of the axes may be set based on the ground surface. In other words, three axes representing three dimensions may be represented by two axes that are parallel to the ground surface and one axis that is perpendicular to the ground surface upward of the ground surface. In this case, the two axes that are parallel to the ground surface will be referred to as horizontal axes, and the one axis that is perpendicular to the ground surface will be referred to as a vertical axis. In addition, a plane that is parallel to the ground surface will be referred to as a horizontal plane (or a horizontal surface).

According to an example below, it will be assumed that the y-axis is the vertical axis, and the rest axes, which are the x and z-axes, are the horizontal axes. Therefore, an xz plane may be the horizontal surface.

Meanwhile, distribution of the object in the y-axis, which is a longitudinal direction (a vertical direction), may not be required to detect the front direction. The y-axis may be an axis arranged in the longitudinal direction, that is, a direction that is perpendicular to the ground surface upward of the ground surface. In other words, since the y-axis clearly represents a direction from a foot to a head, which is a direction that is irrelevant to the front surface of the object, the distribution in the y-axis will not be obtained.

In addition, the front direction may represent a direction of viewing a front side from the front surface of the object (e.g., a face of a person).

Therefore, first, the point cloud (the integrated point cloud) may be projected onto the horizontal surface (e.g., the xz plane) that is parallel to the ground surface to acquire a two-dimensional plane onto which the point cloud is projected.

Next, a front direction vector may be obtained by performing the principal component analysis on the projected point cloud in two-dimensional coordinates. In this way, a more accurate front direction may be detected, and an amount of calculations may be reduced.

According to the PCA, first, a covariance matrix may be obtained, and an eigenvector for the matrix may be obtained. A vector having a smallest eigenvalue between two eigenvectors that are obtained may represent the front direction. In this case, the vector will be referred to as the front direction vector.

Next, the point cloud of the three-dimensional object may be rotated such that the front direction of the three-dimensional object faces one of the axes that are parallel to the ground surface (e.g., the z-axis) by using the front direction vector.

Figures 5A, 5B:
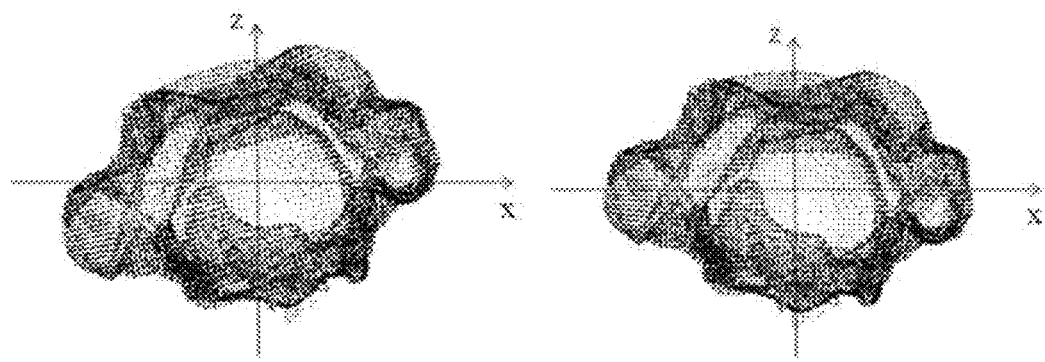

FIG. 5 shows point clouds before and after rotating the point clouds such that the front surface of the object is arranged on the z-axis by using the front direction vector that is detected through the principal component analysis (PCA).

Next, the projection image may be acquired by projecting the rotated three-dimensional object (or three-dimensional point clouds) onto a projection plane. Preferably, the projection plane may be set such that directions of normal vectors of N projection planes divide 360 degrees (in the horizontal surface) into N equal parts about the y-axis (the vertical axis). More preferably, the projection image may be acquired by using an axis-aligned bounding box (AABB). In other words, the AABB may obtain four projection planes, and normals of the four projection planes may quadrisect the 360 degrees.

Figures 6A, 6B:
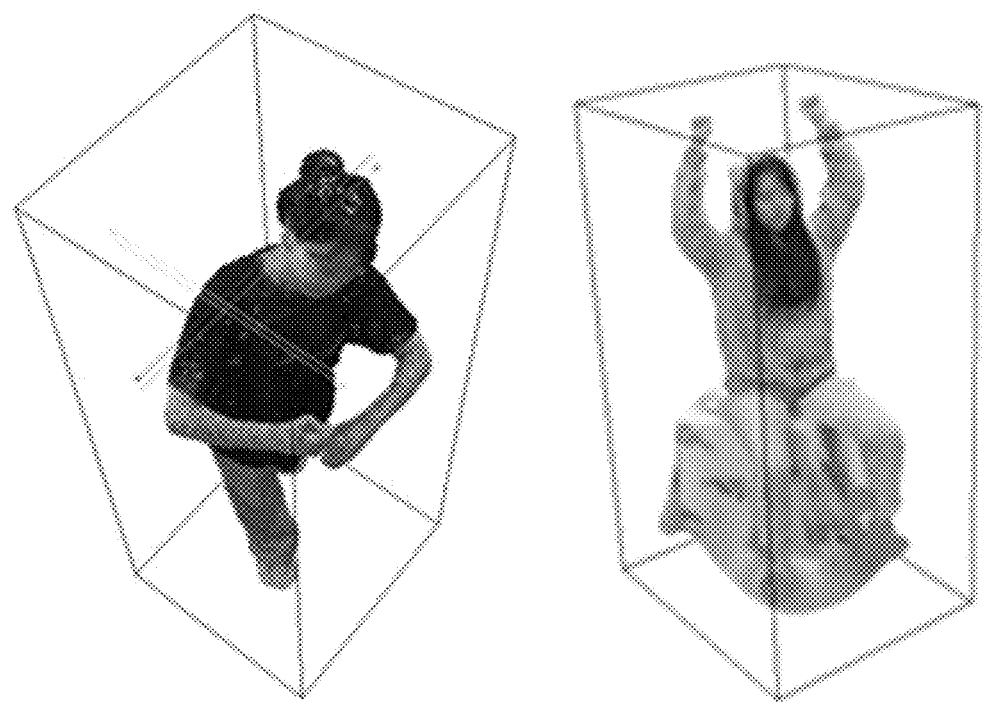
FIGS. 6A-6B are views illustrating setting of an AABB for a three-dimensional object according to one embodiment of the present invention.

In other words, when the object is located on the front side, the AABB for setting the projection plane in a space may be set. The projection may be performed based on the AABB, and the projection image may be generated from each of four surfaces, that is, left, right, front, and rear surfaces of the AABB. FIG. 6 is a view illustrating setting of an AABB for a three-dimensional object.

A process of projecting from three dimensions to a two-dimensional plane may be performed by transforming from the world coordinate system into coordinates on the projection plane through a model view projection (MVP) matrix, which is a 4×4 matrix.

Preferably, a number of projection images may be set to be four. Any number is possible when there are images including the front surface and a side surface (left and right sides). Although accuracy of skeleton extraction may become higher as the number of the projection images increases, it may be efficient to extract the body skeleton from minimum projection images and increase the accuracy through other pre-processing or post-processing (the PCA or post-processing parts).

In addition, the projection image may be acquired by converting the projected object from the coordinate system on the projection plane into a pixel coordinate system. In this case, in order to perform the conversion into the pixel coordinate system, a dynamic range may be changed, and quantization may be performed to achieve an integer form.

Further, the projection image may be configured such that when a point projected onto a pixel exists, a pixel value is set as a color value (RGB) of the point. When the point projected onto the pixel does not exist, the pixel value may be padded with a background color (or 0, 255, etc.).

Next, a two-dimensional (2D) body skeleton may be extracted by using the neural network (S23).

In this step, when the projection image is generated, the body skeleton may be extracted by applying the generated projection image to the neural network. Preferably, an OpenPose neural network may be used as the neural network. In addition, two-dimensional body skeleton images corresponding to a number of input projection images may be acquired. In other words, a two-dimensional skeleton image according to a projection direction may be acquired.

Meanwhile, preferably, the body skeleton image may be acquired by applying each of projection images, which are obtained by two adjacent projection planes, to the neural network. In other words, a skeleton may be acquired sequentially based on front and right projection planes, front and left projection planes, rear and right projection planes, and rear and left projection planes.

In addition, a body joint and a bone for connecting body joints to each other may be displayed in the two-dimensional body skeleton image.

Preferably, when four projection images are generated, the 2D skeleton may be extracted by using OpenPose (see Non-patent Document 2).

OpenPose is a project presented at IEEE Conference on Computer Vision and Pattern Recognition (CVPR) 2017, and refers to a method developed at Carnegie Mellon University in the United States. OpenPose is a library that is based on a convolutional neural network (CNN) and capable of extracting features of bodies of multiple persons from a photograph in real time.

A characteristic of the above project is to rapidly detect poses of multiple persons. Before OpenPose was presented, in order to estimate the poses of the multiple persons, a top-down scheme of repeatedly performing detection of each person in a photograph and detection of a pose for the detected person was mainly used.

OpenPose is a sort of a bottom-up scheme in which performance has been improved without repetitive processing. The bottom-up scheme is a scheme of estimating joints of all persons, connecting positions of the joints to each other, and regenerating the joints at joint positions of the persons corresponding to the joints, respectively. In general, the bottom-up scheme has a problem of determining a person to which a joint belongs. In order to compensate for the above problem, OpenPose uses part affinity fields that allow inference of a person to which a body part belongs.

Figures 7A, 7B, 7C, 7D:
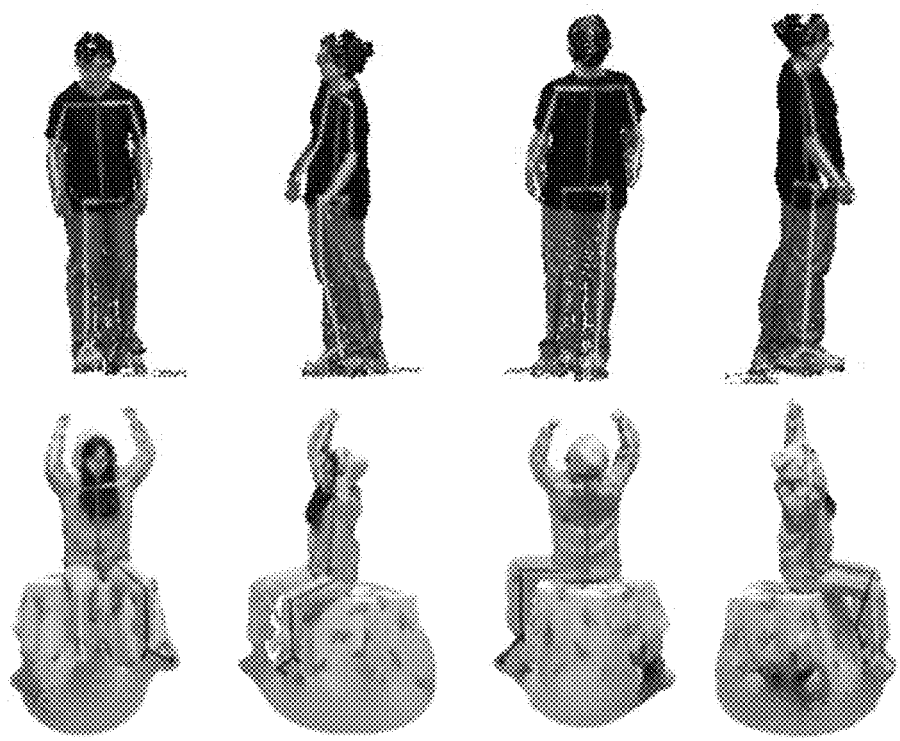
FIGS. 7A-7D show results of projecting two three-dimensional objects based on an AABB, and extracting skeletons for four surfaces (left, right, front, and rear surfaces) according to one embodiment of the present invention.

A result of extracting the skeleton by using OpenPose may be output as an image and a JavaScript object notation (json) file. FIG. 7 shows results of extracting 2D skeletons of projection images.

Next, the three-dimensional body joint may be determined (S24).

The two-dimensional skeleton image in each direction may be restored in three dimensions, and an intersection region of a straight line that is perpendicular to the projection plane in a restored joint (three-dimensional surface joint) of three-dimensional coordinates in each direction may be determined as a three-dimensional joint (or a three-dimensional internal joint).

In other words, when the extracted 2D skeleton in each direction is restored from the pixel coordinate system into the three-dimensional coordinate system, joint coordinates located in a three-dimensional space may be calculated. In this case, three-dimensional joint coordinates restored on the projection plane in each direction will be referred to as surface joint coordinates in each direction. In addition, a joint located on an inner side, which is to be actually obtained, will be referred to as an internal joint (or a three-dimensional joint or a three-dimensional internal joint).

In addition, a middle point of an intersection region of two straight lines passing in the vertical direction (or a corresponding direction) of the projection plane in the corresponding direction may be extracted from respective internal joint coordinates in two adjacent directions. When there are N directions, a total of N middle points of the intersection region in the two adjacent directions may be obtained. Therefore, average coordinates of the N middle points may be extracted as three-dimensional internal joint coordinates.

Figure 8:
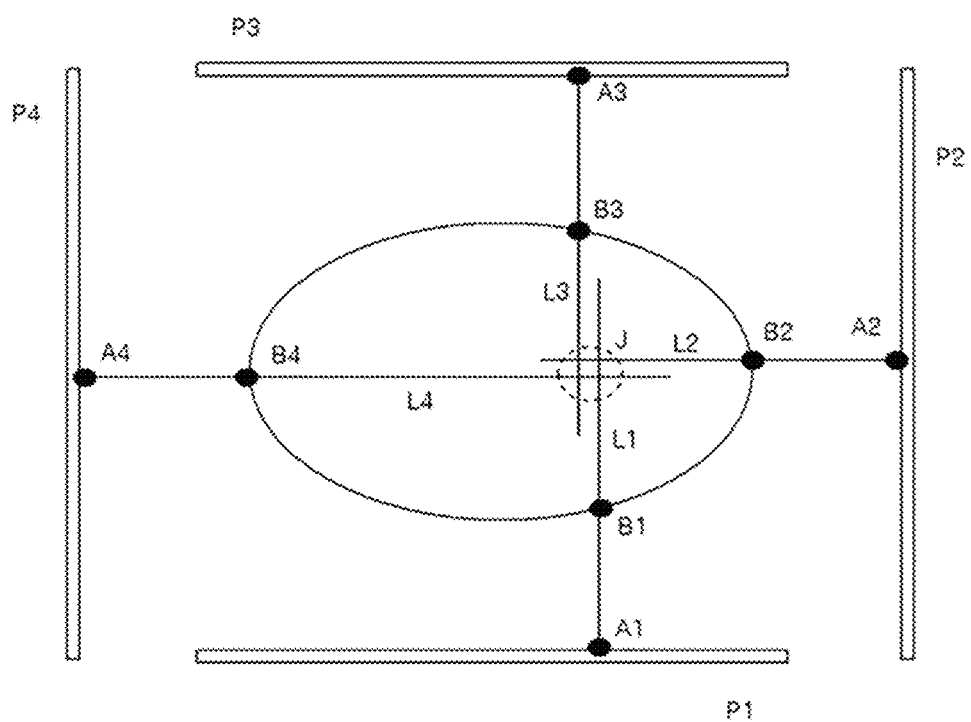
FIG. 8 is a view illustrating a process of extracting a three-dimensional internal joint from a three-dimensional surface joint according to one embodiment of the present invention.
Figure 9A:
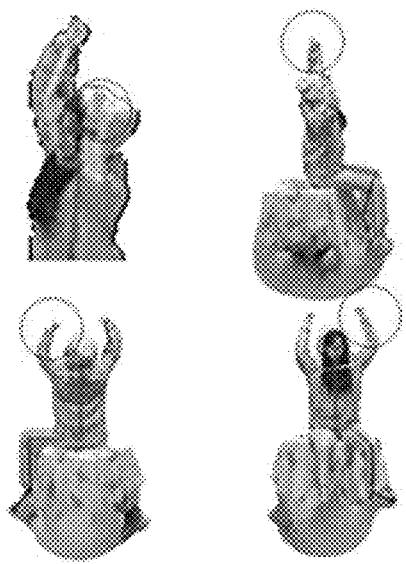
Figure 9B:
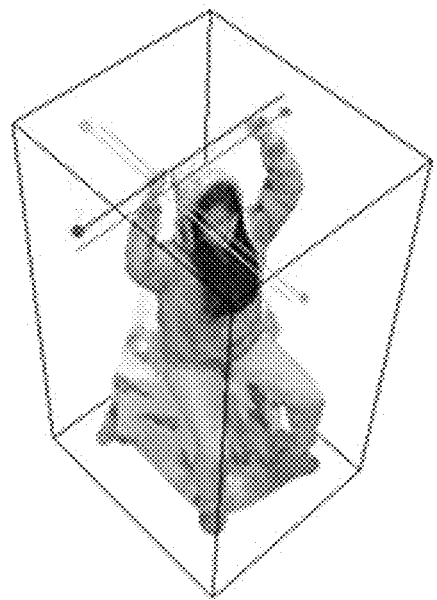
Figure 9C:
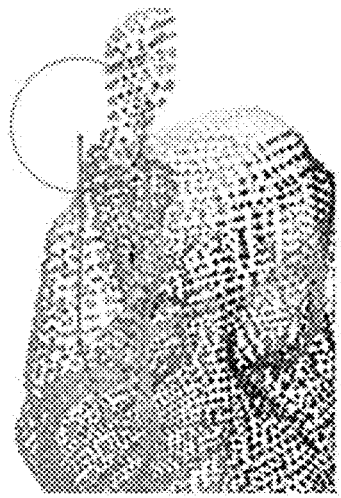
Figure 9D:
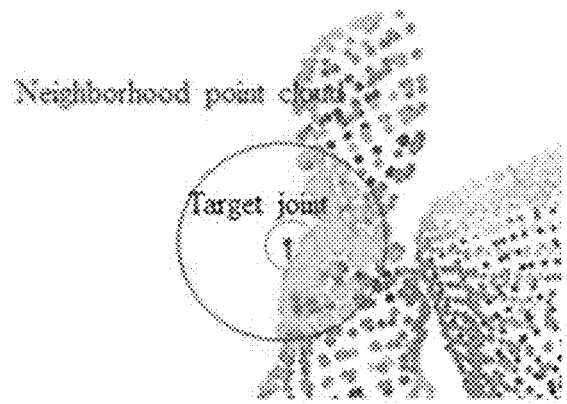

FIG. 8 illustrates a case in which there are four directions. FIG. 8 illustrates that the object is present on the xz plane for convenience of description. However, the object is a three-dimensional object expressed by a three-dimensional point cloud.

In FIG. 8, a total of four projection images (or projection planes) are present. It is assumed that the four projection images are P1, P2, P3, and P4, respectively. In this case, it is assumed that positions indicated as joints in the projection images are A1, A2, A3, and A4, respectively.

When the projection image is restored into the three-dimensional object (the three-dimensional point cloud), the positions A1, A2, A3, and A4 of the projection images may be restored into points B1, B2, B3, and B4 of the three-dimensional object, respectively.

From a viewpoint of the point B1, a three-dimensional internal joint J may be located at any point on a straight line L1, which is perpendicular to the projection image P1 and passes through the point B1. From a viewpoint of the point B2, a three-dimensional internal joint J may be located at any point on a straight line L2, which is perpendicular to the projection image P2 and passes through the point B2.

Meanwhile, since the vertical direction and the projection direction of each of the projection images are parallel to each other, the straight lines L1 and L2 may correspond to straight lines that are parallel to the projection direction and pass through the point B1 and B2, respectively.

In addition, from a viewpoint of the point B3, a three-dimensional internal joint J may be located at any point on a straight line L3, which is perpendicular to the projection image P3 and passes through the point B3. From a viewpoint of the point B4, a three-dimensional internal joint J may be located at any point on a straight line L4, which is perpendicular to the projection image P4 and passes through the point B4.

In this case, an intersection region of two adjacent straight lines (or straight lines in two adjacent directions) may be a joint region J. Therefore, a center point of the intersection region may be obtained.

According to the above example, the straight lines L1 and L2 are adjacent straight lines. Therefore, a center point (middle point) J1 of the intersection region of L1 and L2 may be obtained. Since FIG. 8 has been drawn in a two-dimensional plane, the two straight lines meet at one point. However, since the two straight lines are present in a three-dimensional space in reality, the two straight lines may not meet. Therefore, two points in which a distance between the points is shortest on the two straight lines in the three-dimensional space may be detected, and a middle point of the two points may be obtained as J1.

In addition, there are a total of four pairs of two adjacent straight lines, which are the straight lines L1 and L2, the straight lines L2 and L3, the straight lines L3 and L4, and the straight lines L4 and L1. Therefore, a middle point for each of the pairs may be obtained. Thus, a total of four middle points of four intersection regions of the straight lines in the two adjacent directions may be obtained. Average coordinates of the middle points may be extracted (estimated) as the three-dimensional internal joint coordinates.

Meanwhile, when one side surface of the joint J is covered, a two-dimensional joint may be expressed only in three projection images. For example, in an example of FIG. 9, a two-dimensional joint A4 may not be detected in the projection image P4. Even in this case, an internal joint J may be estimated only from surface joints B1, B2, and B3.

In addition, coordinates having a distance that is greater than or equal to a reference value from other coordinates among coordinates in each direction may be determined as coordinates including an error so as to be removed. Further, the 3D skeleton (or the three-dimensional internal joint) may be acquired through an average value of candidate coordinates that are not removed.

FIG. 9 shows an example of extracting a 3D joint of a right hand.

Next, the body joint may be corrected (S35).

This step may be a post-processing (joint correction) step, in which the determined internal joint may be corrected.

In other words, a plane that bisects an angle formed by at least two bones connected to each joint may be obtained, and points within a predetermined reference value range may be clustered on the plane. Further, a center of a cluster obtained through the clustering may be detected, and coordinates of the internal joint may be corrected by using a center point. In this case, the bone refers to a line for connecting joints to each other.

Figure 10:
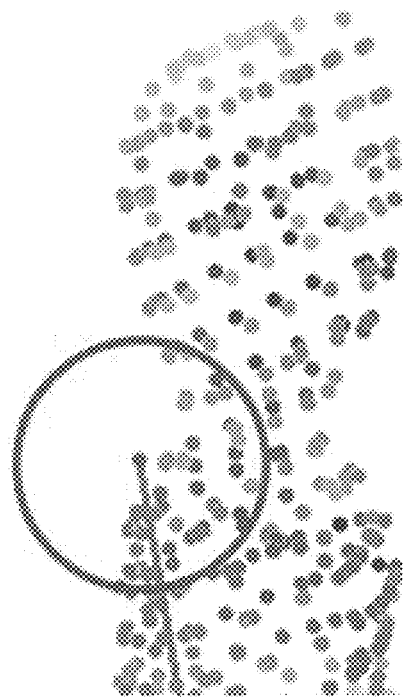
FIG. 10 is a view illustrating a point cloud and an erroneously extracted joint according to one embodiment of the present invention.

FIG. 10 is a view showing a joint located on an outer side of an object due to erroneous extraction. When a position of the three-dimensional joint is detected by using a mislocated joint such as the above joint, the joint may be located on an outer side a 3D model, so that correction for the joint may be required.

Figure 11:
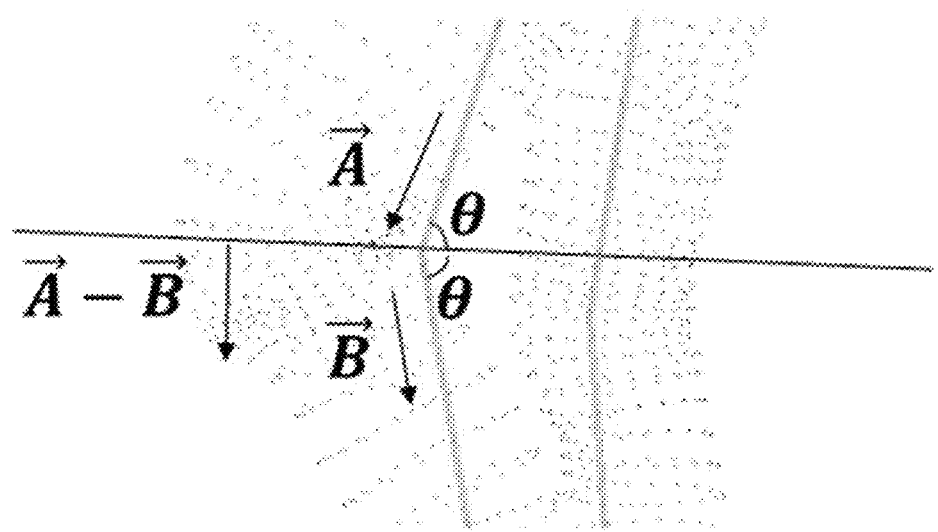
FIG. 11 is a view showing definition of a plane passing through a bisector of bones connected to a joint according to one embodiment of the present invention.

The correction may be performed by setting a plane by using a direction of a bone connected to a target joint, and using a point having a distance that is less than or equal to a reference value (e.g., 3 cm) on the plane. Several sets of points that are adjacent to the plane may be obtained, and the clustering may be performed to detect a valid group for the joint among the point sets. The plane has been set to be a bisector of two bones connected to the joint. FIG. 11 is a view showing a set plane.

According to the present invention, a density-based spatial clustering of applications with noise (DBSCAN) algorithm has been used for clustering a point cloud set. Unlike a center-based clustering algorithm such as K-means clustering, DBSCAN is a density-based algorithm, which has higher accuracy for data sets following unspecified distribution (see Non-patent Document 3). In addition, since discrimination of noise is also possible, unlike a graphics model, a noise removal effect for directly captured 3D data, which has much noise, may be obtained. FIG. 12 shows point sets before and after clustering.

The corrected joint position may be obtained by detecting a center of each cluster and using a closest position. In order to detect the center of the cluster, each cluster may be subject to circle fitting. When center coordinates of a circle to be obtained for one cluster is $(x_c, y_c, z_c)$, and a radius of the circle is r, a circle having a smallest error for n points $(x_i, y_i, z_i)$ within the cluster may be expressed by Mathematical Formula 5.

$$(x_i-x_c)^2+(y_i-y_c)^2+(z_i-z_c)^2=r^2 \quad (5)$$

In this case, when $W(w_0,w_1,w_2,w_3)$ is set as a matrix as in Mathematical Formula 5-2, Mathematical Formula 5 may be expressed as Mathematical Formula 6.

$$W(w_0,w_1,w_2,w_3)=(2x_c, 2y_c, 2z_c, (r^2-x_c^2-y_c^2-z_c^2)) \quad (5-2)$$

$$(x_i,y_i,z_i,1)*W=x_i^2+y_i^2+z_i^2 \quad (6)$$

In this case, when matrices A and B for the n points are expressed by Mathematical Formula 7, Mathematical Formula 6 may be expressed as a determinant as in Mathematical Formula 8.

$$A=\begin{bmatrix} x_1 & y_1 & z_1 & 1 \\ x_2 & y_2 & z_2 & 1 \\ \cdots \\ x_n & y_n & z_n & 1 \end{bmatrix}, B=\begin{bmatrix} x_1^2 & y_1^2 & z_1^2 \\ x_2^2 & y_2^2 & z_2^2 \\ \cdots \\ x_n^2 & y_n^2 & z_n^2 \end{bmatrix} \quad \text{[Mathematical Formula 7]}$$

$$AW=B \quad \text{[Mathematical Formula 8]}$$

Regarding the above formula, WA that allows an error to be smallest among possible W may be obtained through Mathematical Formula 9.

$$\hat{W}=(A^TA)^{-1}A^TB \quad (9)$$

FIG. 13 is a view showing a center of a cluster derived through Mathematical Formulas 5 to 9.

Figure 14A:
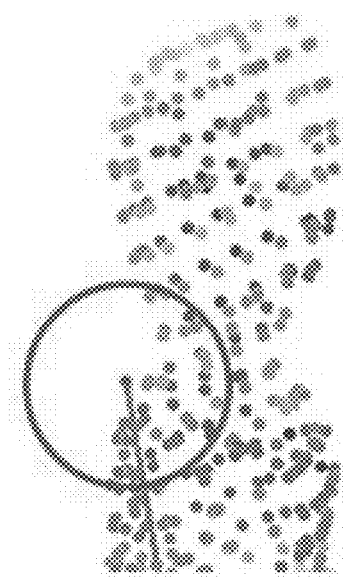
FIGS. 14A-14B are views illustrating 14A a joint located on an outer side of an object before correction and 14B a joint moved to an inner side of the object after the correction according to one embodiment of the present invention.
Figure 14B:
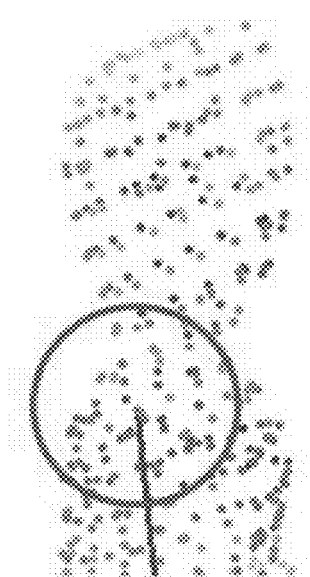

FIG. 14(a) is a view showing a state before correction according to the method of the present invention, and FIG. 14(b) is a view a state after the correction. It may be found through FIG. 14 that the position of the skeleton is improved.

Centers of clusters may be candidates for joints. Among coordinates, a center of the cluster that is closest to joint coordinates before the correction may be set as the body joint.

Next, the face region and the hand region may be detected based on the body joint (S30).

When the body joint is extracted from the low-resolution color-depth video, a joint of a neck of a face or a wrist may be detected from among body joints by comparing geometric configurations between the extracted body joints with each other.

In other words, a configuration (especially a geometric configuration) of a standard body joint or skeleton for the body may be set (stored) in advance. The geometric configuration may include a connection relation between joints, a length ratio, rotation angle ranges of two bones connected to each other based on a joint, and the like.

In addition, when the joint is extracted from the low-resolution video, a configuration to which each body joint corresponds may be detected by comparing the geometric configurations between the extracted joints with each other (see Patent Document 2). Since a conventional technology may be used as a technology for extracting a skeleton of an actual video in comparison with a model of a standard skeleton, detailed descriptions thereof will be omitted.

In other words, the joint of the neck or the wrist may be detected in the configuration of the skeleton extracted from the low-resolution video.

Figure 15:
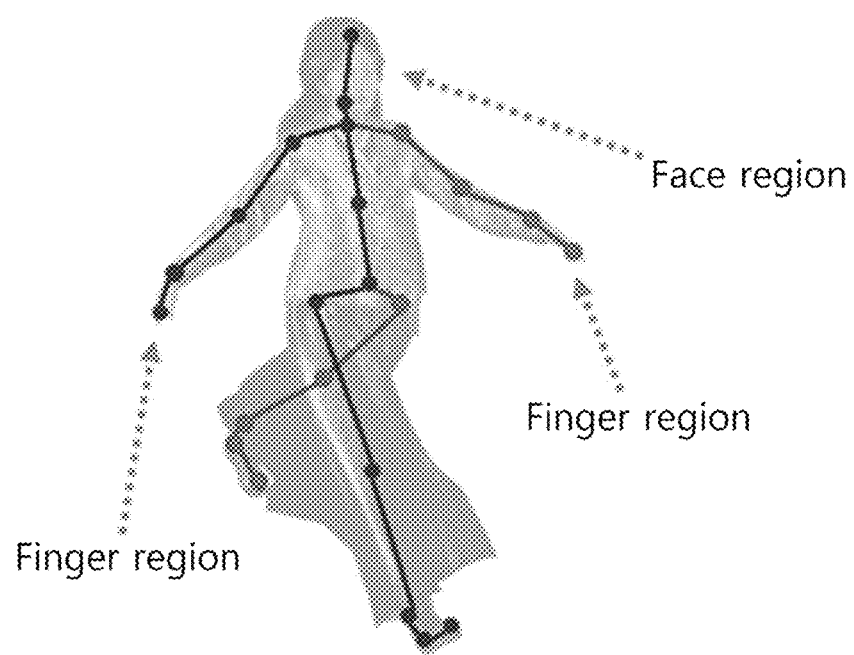
FIG. 15 is a view illustrating a face region and a hand region according to one embodiment of the present invention.

In addition, as shown in FIG. 15, the face or hand region may be detected from a direction, a size, and a rotation range of the face or the hand based on the detected joint of the neck or the wrist.

In a case of the joint of the neck, a direction that is opposite to a direction of a joint of a waist part connected to the joint of the neck may be the face region. In addition, the face may be rotated only within a predetermined angle range about the joint of the neck. In other words, a range or a rotation angle at which a person rotates the face may be restricted within a predetermined range. Further, a size (length) of the face may be obtained by comparing the size (length) of the face with a total body length, a waist length, or the like in the configuration of the skeleton. That is, when a standard skeleton model of the body is applied, the size of the face may be estimated from the total body length or the waist length in a low-resolution configuration of the skeleton.

In addition, in a case of the joint of the wrist, a direction that is opposite to a direction of a joint of an elbow connected to the joint of the wrist may be the hand region. Further, a range such as a rotation angle of the hand may be restricted based on the joint of the wrist. In addition, a size of the hand may be estimated from a length between the joints of the wrist and the elbow.

In other words, the direction, the size, and the rotation range of the face may be estimated based on the joints of the neck and the wrist, and an estimated maximum range may be extracted as the face region or the hand region.

That is, according to the present invention, the high-resolution video for a region corresponding to positions of the face and the hand may be extracted as compared with a position of the entire body, and joints and skeletons of the face and the hand may be searched for only in a selected region of the high-resolution video. Therefore, according to the present invention, in order to increase efficiency of processing an image for a high resolution, which requires a long time, a search region for face and hand parts may be minimized.

Next, the detailed joint may be extracted from the high-resolution video corresponding to the detected face and hand regions (S40).

When the face region and the hand region are detected in the configuration of the skeleton based on the low-resolution video in the previous step, face and hand regions of the high-resolution video corresponding to the face and hand regions may be extracted.

Figure 16A:
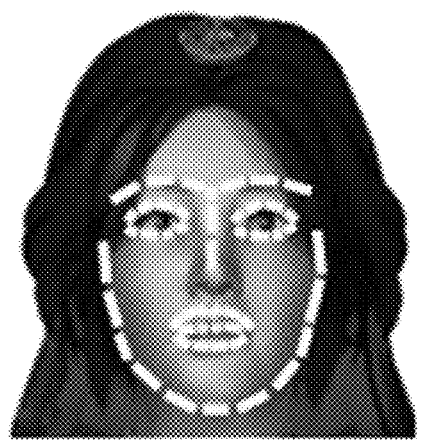

As shown in FIG. 16(a), a detailed facial expression may move within a predetermined structure according to a detailed facial element such as an eye, a nose, and a mouth or a facial muscle. As described above, a detailed structure of the face may also include a joint. In other words, in general, detailed joints may be set in a standard face model in advance (see Patent Document 3 and Non-patent Document 1).

Figure 16B:
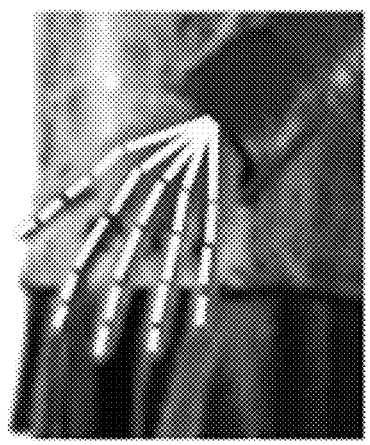

In addition, as shown in FIG. 16(b), the hand may include a detailed joint (or a detailed skeleton) such as a joint and a skeleton of each finger.

The detailed joint may be extracted from the face and hand regions of the high-resolution video. Since a conventional technology may be used as a technology for extracting a detailed joint from the face region, detailed descriptions thereof will be omitted (see Patent Document 3 and Non-patent Document 1). In addition, a conventional technology may also be used as a technology for extracting a detailed joint from the hand region (see Patent Documents 4 and 5).

Preferably, the detailed joints or the detailed skeletons of the face and the hand may be extracted by using an image processing or deep learning technology. In this case, there is no limitation on the image processing and deep learning technology to be used. In particular, when a plurality of images are used for the detailed joints or the detailed skeletons of the face and the hand, an image having highest reliability or probability value output by a deep learning model may be selected and used.

Next, an entire skeleton configuration or the motion data may be generated by integrating the body joint and the detailed joint (S50).

In other words, the body joint (or the body skeleton) of the entire body and the detailed joints (or the detailed skeletons) of the face and the hand may be integrated. In a case of a joint (or a skeleton) extracted from another video, coordinates between the videos may be matched, and then integrated into one coordinate system. That is, when the videos have different resolutions, the resolutions may be matched, and the coordinates of each joint (or skeleton) may be scaled and matched to one coordinate.

In other words, each camera parameter has been obtained through calibration for the multiview color-depth camera and the high-resolution camera. Therefore, the joint and the skeleton extracted from the video of each of the cameras may be integrated into the world coordinate system (or the reference coordinate system). That is, a spatial position relation between the low-resolution RGB-D camera and the high-resolution RGB camera may be obtained and stored through an initial external calibration process. In addition, the body joint and the detailed joint may be integrated into one world coordinate system by using the stored spatial position relation.

That is, the body point and the detailed joint may be combined to form an integrated final joint. In addition, the final joint and bones between the joints may be connected to each other to generate a final entire skeleton.

The final entire skeleton may be used as the motion data.

Next, necessity and effects of the present invention will be described in more detail.

Since an integrated motion capture technology using an image according to the present invention tracks and analyzes a motion based on an image, the motion capture is possible in a general environment without establishment of a dedicated studio. In addition, regarding a target of the motion capture, the technology according to the present invention may capture animals and moving objects as well as persons (multiple people are possible at the same time), thereby remarkably overcoming disadvantages of a conventional motion capture technology.

The present invention may capture all movements of the face, the body, and the hand through one operation, so that a work process may be remarkably shortened, and manpower/time/production costs in a VFX field where the motion capture is utilized may be reduced. In addition, when videos are acquired from various angles by using a plurality of cameras, there is an advantage in that a movement may be captured more precisely and in detail.

In addition, structural limitations of an optical motion capture technology may be overcome.

In other words, the image-based integrated motion capture technology according to the present invention may overcome schemes and limitations of the conventional motion capture technology. The current motion capture technology, which is mainly used, adopts a marker scheme so that a capture target is limited to a person, and has a structural limitation that requires a studio with a controlled environment.

The present invention has effects of replacing expensive motion capture equipment and improving a work structure. In these days, since VFX studios that use the motion capture are required to purchase/install expensive equipment, companies that may use the motion capture technology are extremely limited. In addition, due to double work processes of capturing the movements of the face, the body, and the hand with different types of equipment and combining results thereof into one piece, the related art has a problem in that work efficiency decreases while costs increase.

In addition, an application field and a market of the motion capture may be expanded.

The image-based integrated motion capture technology according to the present invention may expand the application field of the motion capture. The motion capture technology is no longer limited to a VFX market, but is expanding to various fields such as games, medical care, education, sports, and entertainment, and a demand for the motion capture technology is increasing day by day. Although the number of industrial fields that require a technology using the motion capture is increasing, supply is slow as compared with a demand due to a cost problem and a limited use environment of a conventional motion capture system. Therefore, the present invention may expand the market because the present invention may achieve a low construction cost, easy use, and a simplified work process.

Although the present invention invented by the present inventor has been described in detail with reference to the above embodiments, the present invention is not limited to the embodiments, and various modifications are possible without departing from the gist of the present invention.

What is claimed is:

1. A full-body integrated motion capture method comprising:
   (a) receiving a multiview color-depth video and a high-resolution video;
   (b) extracting a body skeleton from the multiview color-depth video;

(c) detecting face and hand regions by using joints of a neck and a wrist of the body skeleton;

(d) extracting a joint of a predetermined detail level from a region of the high-resolution video corresponding to the face and hand regions; and (e) generating motion data by integrating a body joint and the joint of the predetermined detail level, wherein the step (b) includes:

(b1) generating a point cloud of a three-dimensional object;

(b2) acquiring a projection image obtained by projecting the point cloud of the three-dimensional object onto at least three projection planes that are different from each other;

(b3) acquiring a two-dimensional skeleton image in each direction for each of at least three projection images by using a neural network, in which a two-dimensional joint and a bone configured to connect joints to each other are displayed in the two-dimensional skeleton image;

(b4) restoring the two-dimensional skeleton image in each direction, and detecting a three-dimensional internal joint by using a restored three-dimensional surface joint in each direction; and (b5) generating a three-dimensional body skeleton including the detected three-dimensional internal joint.

2. The full-body integrated motion capture method of claim 1, wherein, in the step (b2), the projection image in each direction is acquired by setting the projection plane in each direction such that directions of normal vectors of N projection planes divide 360 degrees into N equal parts about a vertical axis, and projecting the point cloud of the three-dimensional object onto the projection plane in each direction.

3. The full-body integrated motion capture method of claim 2, wherein, in the step (b2), the projection image is acquired by obtaining an axis-aligned bounding box (AABB) for the three-dimensional object, and performing the projection onto four surfaces of the AABB, which are left, right, front, and rear surfaces of the AABB.

4. The full-body integrated motion capture method of claim 1, wherein, in the step (b2), the projection image for the three-dimensional object is acquired by projecting the point cloud of the three-dimensional object onto a horizontal plane, obtaining a front direction vector on a two-dimensional plane onto which the point cloud is projected, and rotating the three-dimensional object such that a front surface of the three-dimensional object is arranged on a vertical axis by using the front direction vector.

5. The full-body integrated motion capture method of claim 4, wherein, in the step (b2), the front direction vector is obtained through principal component analysis, in which a covariance matrix is obtained for the two-dimensional plane onto which the point cloud is projected, an eigenvector for the obtained matrix is obtained, and a vector having a smallest eigenvalue is set as the front direction vector.

6. The full-body integrated motion capture method of claim 1, wherein the neural network includes an OpenPose network.

7. The full-body integrated motion capture method of claim 1, wherein, in the step (b4), the two-dimensional skeleton image in each direction is restored into three-dimensional coordinates, and an intersection region of a straight line that is perpendicular to the projection plane in the restored surface joint of the three-dimensional coordinates in each direction is determined as the three-dimensional internal joint.

8. The full-body integrated motion capture method of claim 1, wherein, in the step (b5), for each internal joint of the generated three-dimensional skeleton, a plane that bisects an angle formed by at least two bones connected to the internal joint (hereafter referred to as "division plane") is obtained, points within a predetermined reference value range in the division plane are clustered, a center of a cluster obtained through the clustering is detected, and coordinates of the internal joint are corrected by using a center point.

9. The full-body integrated motion capture method of claim 8, wherein, in the step (b5), the clustering is performed by using a density-based spatial clustering of applications with noise (DBSCAN) algorithm, and the center point is detected by performing circle fitting.

10. A non-transitory computer-readable recording medium recorded with a program for performing a full-body integrated motion capture method according to claim 1.

* * * * *